United States Patent
Song et al.

(10) Patent No.: US 12,514,128 B2
(45) Date of Patent: Dec. 30, 2025

(54) MAGNETIC MEMORY DEVICE AND MANUFACTURING METHOD THEREOF

(71) Applicant: Taiwan Semiconductor Manufacturing Company, Ltd., Hsinchu (TW)

(72) Inventors: Ming-Yuan Song, Hsinchu (TW); Chien-Min Lee, Hsinchu County (TW); Shy-Jay Lin, Hsinchu County (TW); Tung-Ying Lee, Hsinchu (TW); Xinyu Bao, Fremont, CA (US)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 657 days.

(21) Appl. No.: 17/900,892

(22) Filed: Sep. 1, 2022

(65) Prior Publication Data

US 2023/0389440 A1 Nov. 30, 2023

Related U.S. Application Data

(60) Provisional application No. 63/346,905, filed on May 30, 2022.

(51) Int. Cl.
| H10N 50/10 | (2023.01) |
| H10B 61/00 | (2023.01) |
| H10N 50/01 | (2023.01) |
| H10N 50/80 | (2023.01) |
| H10N 50/85 | (2023.01) |

(52) U.S. Cl.
CPC ............. *H10N 50/10* (2023.02); *H10B 61/22* (2023.02); *H10N 50/01* (2023.02); *H10N 50/80* (2023.02); *H10N 50/85* (2023.02)

(58) Field of Classification Search
CPC ........ H10N 50/10; H10N 50/80; H10N 50/01; H10N 50/85; H10B 61/22
USPC ....................................................... 257/421
See application file for complete search history.

(56) References Cited

U.S. PATENT DOCUMENTS

| 10,644,064 | B2* | 5/2020 | Lee | H10N 50/01 |
| 11,605,670 | B2* | 3/2023 | Luo | G11C 11/1693 |
| 2018/0277593 | A1* | 9/2018 | Lee | H10B 61/00 |
| 2018/0358542 | A1* | 12/2018 | Mihajlovic | G11C 11/161 |
| 2019/0326353 | A1* | 10/2019 | O'Brien | H10N 70/826 |
| 2020/0006424 | A1* | 1/2020 | Sato | H10B 61/22 |
| 2020/0006631 | A1* | 1/2020 | Sato | H10N 50/85 |
| 2021/0074344 | A1* | 3/2021 | Hu | G11C 11/161 |
| 2021/0134339 | A1* | 5/2021 | Song | G11C 11/18 |
| 2021/0202827 | A1* | 7/2021 | Song | H10N 50/01 |
| 2021/0359199 | A1* | 11/2021 | Lin | H10N 52/01 |
| 2023/0389448 | A1* | 11/2023 | Lee | H01F 10/329 |

* cited by examiner

Primary Examiner — Jami Valentine Miller
(74) Attorney, Agent, or Firm — JCIPRNET

(57) ABSTRACT

A magnetic memory device includes a substrate, a spin-orbit torque (SOT) induction structure, and a magnetic tunnel junction (MTJ) stack. The SOT induction structure is disposed over the substrate. The SOT induction structure includes a metal and at least one dopant. The MTJ stack is disposed over the SOT induction structure.

20 Claims, 15 Drawing Sheets

MAGNETIC MEMORY DEVICE AND MANUFACTURING METHOD THEREOF

CROSS-REFERENCE TO RELATED APPLICATION

This application claims the priority benefit of U.S. Provisional application Ser. No. 63/346,905, filed on May 30, 2022. The entirety of the above-mentioned patent application is hereby incorporated by reference herein and made a part of this specification.

BACKGROUND

A magnetic random access memory (MRAM) offers comparable performance to volatile static random access memory (SRAM) and comparable density with lower power consumption to volatile dynamic random access memory (DRAM). Compared to non-volatile memory (NVM) flash memory, an MRAM offers much faster access times and suffers minimal degradation over time, whereas a flash memory can only be rewritten a limited number of times. One type of an MRAM is a spin transfer torque magnetic random access memory (STT-MRAM). An STT-MRAM utilizes a magnetic tunneling junction (MTJ) written at least in part by a current driven through the MTJ. Another type of an MRAM is a spin orbit torque (SOT) MRAM (SOT-MRAM), which generally requires a lower switching current than an STT-MRAM.

BRIEF DESCRIPTION OF THE DRAWINGS

Aspects of the present disclosure are best understood from the following detailed description when read with the accompanying Figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
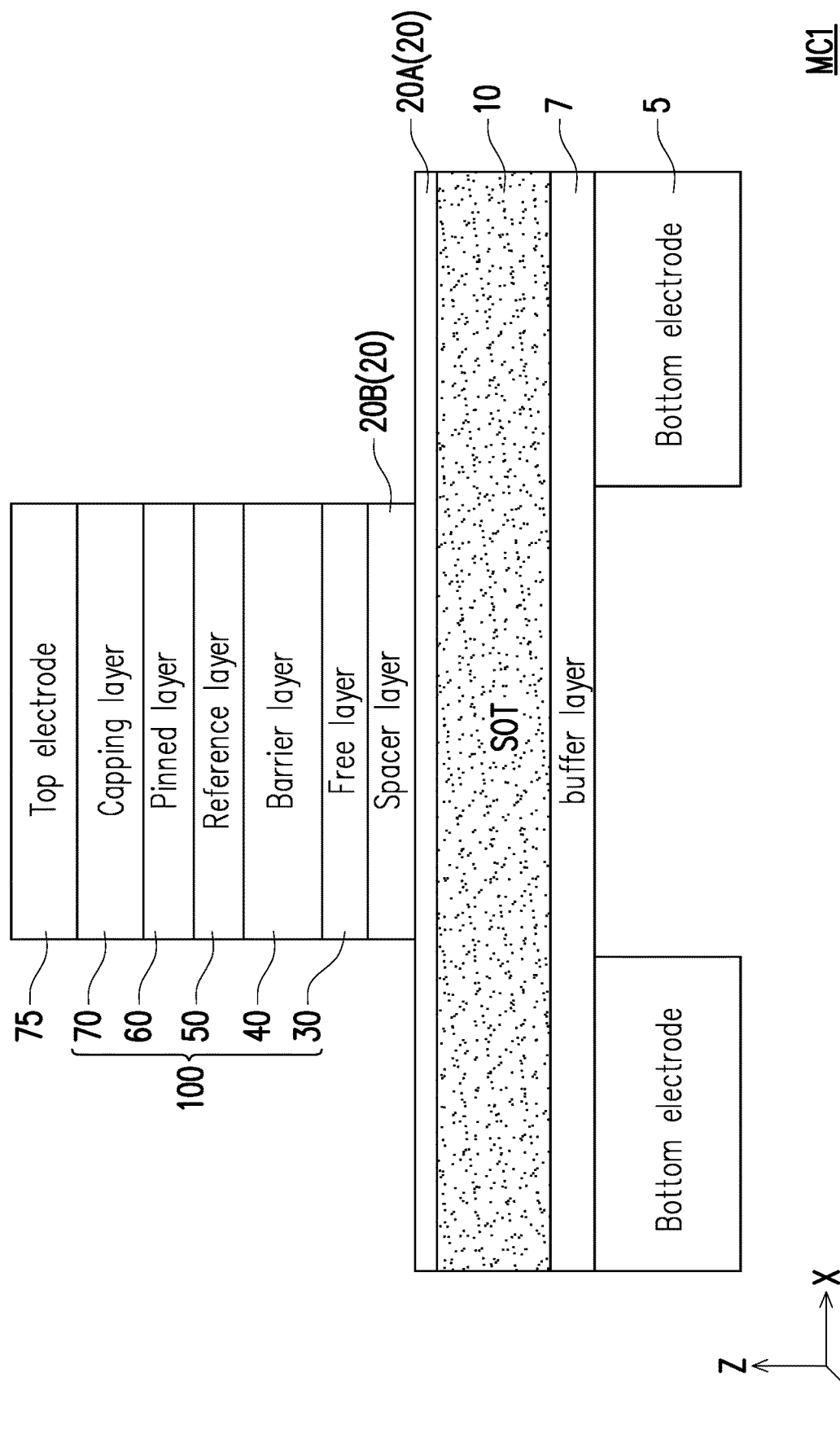
FIG. 1 is a schematic view of a magnetic memory cell according to some embodiments.

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the Figures. The spatially relative terms are intended to encompass different orientations of the device in use or operation in addition to the orientation depicted in the Figures. The apparatus may be otherwise oriented (rotated 90 degrees or at other orientations) and the spatially relative descriptors used herein may likewise be interpreted accordingly. In addition, the term "made of" may mean either "comprising" or "consisting of." Further, in the following fabrication process, there may be one or more additional operations in/between the described operations, and the order of operations may be changed. In the present disclosure, a phrase "one of A, B and C" means "A, B and/or C" (A, B, C, A and B, A and C, B and C, or A, B and C), and does not mean one element from A, one element from B and one element from C, unless otherwise described. Materials, configurations, dimensions, processes, and/or operations described with respect to one embodiment may be employed in the other embodiments, and detailed explanation thereof may be omitted.

In an SOT-MRAM, the magnetic moment of the free magnetic layer of an MTJ film stack is switched using the spin-orbit interaction effect generated by a current flowing adjacent to the free magnetic layer of the MTJ film stack. This current can flow in a SOT induction structure. Manipulating the free magnetic layer orientation causes a resistance change of the MTJ film stack, which may be used to record a data value in the cell. The magnetic moment of the free magnetic layer may be switched spin-orbit torque only or with assistant magnetic field. There are three general types of SOT-MRAM, which depend on the orientation relationship between the magnetization of free magnetic layer and the write current flowing through the SOT induction structure. An x-type of SOT-MRAM has a free magnetic layer moment which is parallel to the current through the SOT induction structure and an assistant magnetic field which is orthogonal to the plane of the current flow in the SOT induction structure. A y-type of SOT-MRAM has a free magnetic layer moment which is perpendicular to, but in the same plane as, the direction of the current through the SOT induction structure. A z-type of SOT-MRAM has a free magnetic layer moment which is orthogonal to the plane of the current flow through the SOT induction structure and an assistant magnetic field is needed which is parallel to the current flow.

Although the present disclosure generally relates to an x-type of SOT-MRAM, some of the aspects discussed herein may be transferrable to the other types of SOT-MRAM devices, such as will be discussed below. In x-type of SOT-MRAM devices, the assistant magnetic field to switch the free magnetic layer may be generated externally to the cell, thereby complicating the cell structure. Embodiments of the present disclosure improve performance in several ways.

Figure 2:
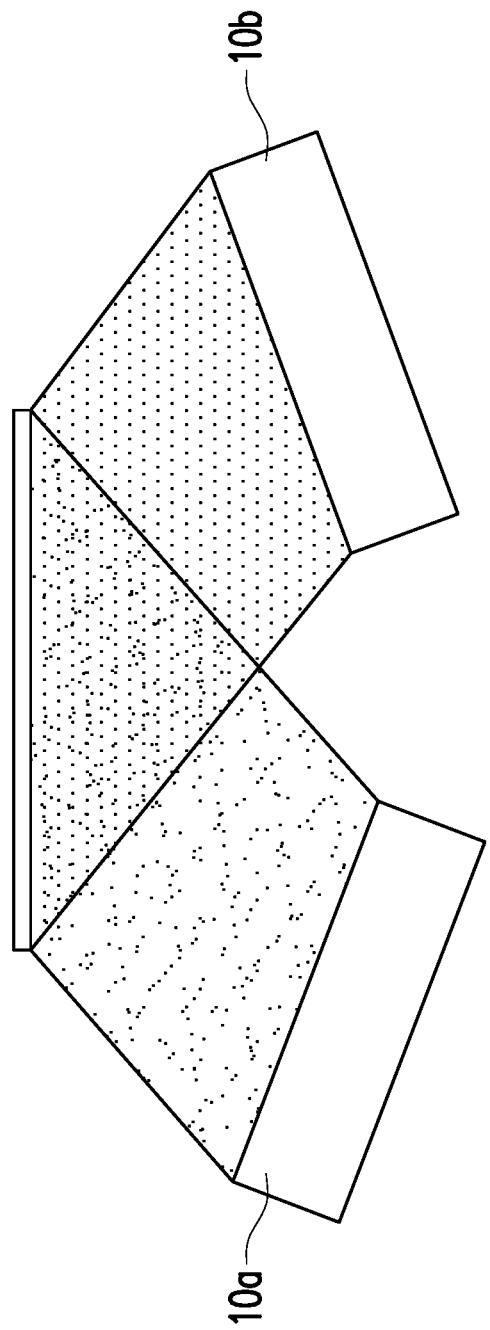
FIG. 2 and FIG. 3 are a schematic view of intermediate step used in formation of a SOT induction structure according to some embodiments.
Figure 3:
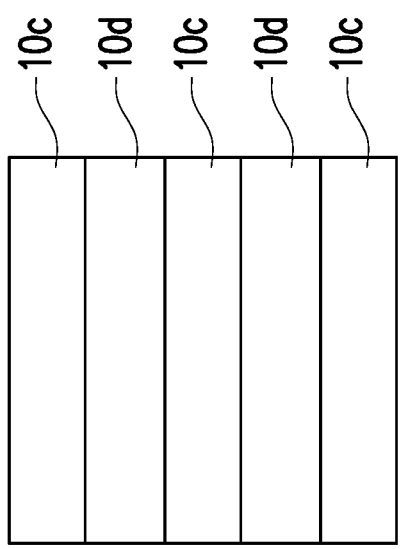

FIG. 1 illustrates a schematic view of the SOT-MRAM function elements of a magnetic memory cell MC1 according to some embodiments of the present disclosure. FIG. 2 and FIG. 3 illustrates intermediate step used in formation of a SOT induction structure 10. The elements of FIG. 1 may include a bottom electrode 5 and/or buffer layer 7, a SOT induction structure 10, and a MTJ film stack 100. It should be understood that these layers may include multiple sub-layers comprising different materials, which will be discussed in detail below. The SOT induction structure 10 serves as a spin-orbit interaction active layer to provide induction influence on the MTJ film stack 100. The SOT induction structure 10 is a perpendicular Hall metal (p-HM) structure and may be alternatively referred to as a p-HM structure 10.

The SOT induction structure 10 may be formed over an optional bottom electrode 5 and/or optional buffer layer 7. The bottom electrode 5 may include one or more layers of Cu, W, Ta, TiN, TaN, Ru, Au, and Al. In some embodiments, the buffer layer 7 may function as a structural isolation layer for the SOT induction structure 10 above, i.e., to separate the structure of the bottom electrodes 5 from the structure of the SOT induction structure 10. In some embodiments, the buffer layer 7 may also function as a seed layer for the SOT induction structure 10. In some embodiments, the buffer layer 7 may include a thinly deposited insulating material layer with tunneling capability, such as MgO deposited to a thickness between 2 Å and 9 Å.

The SOT induction structure 10 may be a metal doped with at least one dopant, i.e., the SOT induction structure 10 may include a metal and the at least one dopant. With the aid of dopant, it can assist the metal to maintain the desired phase, therefore, the thickness and spin-Hall angle (SHA) of SOT induction structure 10 may be increased, the resistivity may be decreased, while the good thermal stability of magnetic memory device MC1 may be maintained (data as shown in Table 1). In some embodiments, the thickness of the SOT induction structure 10 may be greater than or equal to 5 nm, and the spin Hall angle (SHA) of the SOT induction structure 10 may be greater than 0.4. In some embodiments, since the thickness may be increased, the MTJ etching recess window can be improved to decrease probability of occurrence of short or other electrical issue, but not limited to.

TABLE 1

| Thickness(μm) | ρw (μΩ*cm) | SHA | Damping | $M_{eff}$(Oe) |
|---|---|---|---|---|
| 5.25 | 87.1 | 0.33 | 0.009 | 16206 |
| 7.5 | 108.99 | 0.42 | 0.008 | 13604 |
| 9.75 | 49.9 | 0.03 | 0.009 | 11885 |
| 5.25 | 79.62 | 0.19 | 0.008 | 15830 |
| 7.5 | 98.88 | 0.23 | 0.08 | 14433 |
| 9.75 | 103.69 | 0.17 | 0.012 | 12972 |
| 5.25 | 72.82 | 0.16 | 0.007 | 15690 |
| 7.5 | 95.5 | 0.2 | 0.008 | 14532 |
| 9.75 | 93.91 | 0.07 | 0.012 | 11976 |

In some embodiments, the SOT induction structure 10 may be a doped W (doped tungsten), and the doped W may include Co, Ru, Pt, CoFeB (CFB), Ta, MgO, or combinations thereof, i.e., the SOT induction structure 10 may include a metal (W) and the at least one dopant (Co, Ru, Pt, CoFeB, Ta, MgO, or combinations thereof). For example, the at least one dopant may include heavy metal, magnetic material, insulator, or combinations thereof, the heavy metal may include Pt and/or Ta, the magnetic material may include Co and/or CoFeB, and the insulator may include MgO, therefore, the at least one dopant can hold up transformation from β-W to α-W, and the desired phase (β-W) is maintained.

In some embodiments, α-W is the undesired phase, β-W is a metastable structure between amorphous-W and α-W, the dopant may break the α-W texture formation, and may have different crystal structure to slow down or inhibit transformation to α-W, i.e., the desired phase (β-W) may be maintained. In some embodiments, amorphous structure (such as CoFeB), HCP structure (such as Co, Ru) and/or FCC structure (such as Pt) materials are stabilized in β-W phase due to lattice mismatch with α-W (BCC structure). In some embodiments, conductive materials (such as Co, Ru, Pt) may reduce the resistivity of doped W.

In some embodiments, the SOT induction structure 10 is not a stacked structure, the SOT induction structure 10 may not include multiple layers, therefore, there is substantially no interface in the SOT induction structure 10, and the SOT induction structure 10 may be a doping state. In some embodiments, different to alloy, a percent of the at least one dopant may be less than 10% of the SOT induction structure 10 to ensure that the metal (W) maintains the original material property, but not limited to. In some embodiments, low concentration of Co and/or low concentration of CoFeB can boost SHA without too much enhancement in resistivity.

With reference to FIG. 2, in some embodiments, the SOT induction structure 10 may be formed by sputtering a metal material 10a and a dopant material 10b simultaneously to form doped state. In some embodiments, the metal material 10a may be tungsten (W), and dopant material 10b may be cobalt (Co). With reference to FIG. 3, in some embodiments, the SOT induction structure 10 may be formed by following steps. A plurality of metal material layers 10c and a plurality of dopant material layers 10d may be formed, and the plurality of metal material layers 10c and the plurality of dopant material layers 10d are alternately stacked. The top layer may be metal material layers 10c. Next, a heating process is performed, such that the plurality of dopant material layers 10d are dispersed into the plurality of metal material layers 10c to form doped state (substantially no interface in the SOT induction structure 10). In some embodiments, the metal material layer 10c may be required to have a certain thinness to form doped state, i.e., a thickness of each of the metal material layer 10c may be less than or equal to 1.5 nm.

With reference to FIG. 1, the MTJ film stack 100 may also include various configurations. In some embodiments, a free layer 30 is disposed over the SOT induction structure 10, a barrier layer 40 is disposed over the free layer 30, and a reference layer 50 is disposed over the barrier layer 40. In some embodiments, a magnetic coupling tuning spacer layer 20 (e.g., spacer layer 20A and/or spacer layer 20B) may be interposed between the SOT induction structure 10 and the free layer 30. Other embodiments may use other arrangements for the MTJ film stack 100. For example, in some embodiments, the structure of FIG. 1 may be inverted, including all the layers of the MTJ film stack 100. As illustrated, the MTJ film stack 100 includes a pinned layer 60 and is "top pinned." In embodiments inverting the structure of the MTJ film stack 100, the resulting film stack would be considered "bottom pinned."

The spacer layer 20 may be formed from a metal material or a dielectric material, such as a metal oxide. Where the spacer layer 20 is formed from a metal material, the spacer layer 20 may be formed of a metal material such as a non-ferromagnetic metal material such as W, Ru, Pt, Mo, Ti, Mg, the like, or combinations thereof. Where the spacer layer 20 may be formed of a dielectric material such as magnesium oxide ($MgO_x$), cobalt oxide ($CoO_x$), aluminum oxide ($AlO_x$), the like, or combinations thereof. In some embodiments, the spacer layer 20 may be formed from multiple layers which each may be a different material, including a metal material and/or a dielectric material. In some embodiments, the spacer layer 20A may be formed and patterned in conjunction with the SOT induction structure 10 and may have a similar foot print as the SOT induction structure 10. In some embodiments, the spacer layer 20B may be patterned when the MTJ film stack 100 is patterned such that the spacer layer 20B may have a similar foot print as the MTJ film stack 100. In some embodiments, both the spacer layer 20A and the spacer layer 20B may be present. In some embodiments, the spacer layer 20 may be omitted.

The total thickness of the spacer layer 20 (including spacer layer 20A and spacer layer 20B) depends on the materials of the free layer 30 and the SOT induction structure 10. Depending on the materials selected for the spacer layer 20, the free layer 30, and the SOT induction structure 10, the spacer layer 20 may have a total thickness between about 2 Å and about 13 Å. In some embodiments, such as when the spacer layer 20 is made of a magnesium oxide, the spacer layer 20 may have a total thickness between about 6.5 Å and about 8.5 Å. In other embodiments, such as when the spacer layer 20 is made of magnesium, the spacer layer 20 may have a total thickness between about 10 Å and about 13 Å. In yet other embodiments, such as when the spacer layer 20 is made of titanium, the spacer layer 20 may have a total thickness between about 6.5 Å and about 10 Å. In still other embodiments, such as when the spacer layer 20 is made of tungsten, the spacer layer 20 may have a total thickness between about 5 Å and about 10 Å.

The free layer 30 may be formed of one or more ferromagnetic materials, such as cobalt iron boron (CoFeB), cobalt/palladium (CoPd), cobalt iron (CoFe), cobalt iron boron tungsten (CoFeBW), nickel iron (NiFe), Ru, Co, alloys thereof, the like, or combinations thereof. The free layer 30 may include multiple layers of different materials, such as a layer of Ru between two layers of CoFeB, a layer of Co between two layers of CoFeB, or a layer of Ru and a layer of Co between two layers of CoFeB, though other configurations of layers or materials may be used. In some embodiments, the material of the free layer 30 includes a crystalline material deposited to have a particular crystalline orientation, such as a (100) orientation. The total thickness of the free layer 30 may be between about 1 nm and about 4 nm.

In some embodiments, the barrier layer 40 is formed of one or more materials such as MgO and AlO, the like, or combinations thereof. In some embodiments, the material of the barrier layer 40 includes a crystalline material deposited to have a particular crystalline orientation, such as a (100) orientation. The material of the barrier layer 40 may be deposited to have the same crystalline orientation as the free layer 30. In some embodiments, the barrier layer 40 may have a thickness between about 0.3 nm and about 3 nm.

The reference layer 50 is second magnetic layer of which the magnetic moment does not change. The reference layer 50 may be made of any of the same materials as the free layer 30 as set forth above, and may have the same material composition as the free layer 30. In some embodiments, the reference layer 50 includes one or more layers of magnetic materials. In some embodiments, the reference layer 50 includes a layer of a combination of cobalt (Co), iron (Fe), and boron (B), such as Co, Fe, and B; Fe and B; Co and Fe; Co; and so forth. In some embodiments, the material of the reference layer 50 includes a crystalline material deposited to have a particular crystalline orientation, such as a (100) orientation. The material of the reference layer 50 may be deposited to have the same crystalline orientation as the barrier layer 40. In some embodiments, a thickness of the reference layer 50 is in a range from about 0.2 nm to about 8 nm.

The pinned layer 60 is a hard bias layer used to pin the spin polarization direction of the reference layer 50 in a fixed direction. Pinning the spin polarization direction of the reference layer 50 allows the magnetic memory device to be toggled between a low-resistance state and a high-resistance state by changing the spin polarization direction of the free layer 30 relative to the reference layer 50. Because the pinned layer 60 is formed over the reference layer 50, the example MTJ film stack 100 shown in FIG. 1 may be considered a "top-pinned" MTJ stack. In some embodiments, however, the order of the layers of the MTJ film stack 100 may be reversed. In such embodiments, because the reference layer 50 would be formed over the pinned layer 60, such an MTJ film stack may be considered a "bottom-pinned" MTJ stack.

The pinned layer 60 may include multiple layers of different materials, in some embodiments, and may be referred to as a synthetic anti-ferromagnetic (SAF) layer. For example, the pinned layer 60 may comprise a stack of one or more ferromagnetic layers and one or more non-ferromagnetic layers. For example, the pinned layer 60 may be formed from a non-ferromagnetic layer sandwiched between two ferromagnetic layers or may be a stack of alternating non-ferromagnetic layers and ferromagnetic layers. The ferromagnetic layers may be formed of a material such as Co, Fe, Ni, CoFe, NiFe, CoFeB, CoFeBW, alloys thereof, the like, or combinations thereof. The non-ferromagnetic layers may be formed of material such as Cu, Ru, Ir, Pt, W, Ta, Mg, the like, or combinations thereof. In some embodiments, the ferromagnetic layer(s) of the pinned layer 60 may have a thickness between about 2 nm and about 5 nm. In some embodiments, a thicker pinned layer 60 may have stronger antiferromagnetic properties, or may be more robust against external magnetic fields or thermal fluctuation. In some embodiments, the non-ferromagnetic layer(s) of the pinned layer 60 may have a thickness between about 2 Å and about 10 Å. For example, the pinned layer 60 may include a layer of Ru that has a thickness of about 4 Å or about 8.5 Å, though other layers or thicknesses are possible. In some embodiments, one or more layers of the pinned layer 60 includes a crystalline material deposited to have a particular crystalline orientation, such as a (111) orientation. The pinned layer 60 may be formed to have an in-plane magnetic anisotropy (IMA), that is, in the same plane as the horizontal direction of the pinned layer 60. In some embodiments, a total thickness of the pinned layer 60 is in a range from about 3 nm to 25 nm.

In some embodiments, the pinned layer 60 may include an anti-ferromagnetic material (AFM) layer such as PtMn or IrMn to provide strong exchange bias to fix the pinned layer. This forms a "spin-valve structure" and provides better stability of the pinned layer.

The capping layer 70 may be a single or multi-layer structure that serves both to protect the layers under the capping layer 70 during subsequent processes and to provide a top electrode for an overlying via or metal line to connect to. The layer(s) may be formed of a non-ferromagnetic material such as such as Cu, Ru, Ir, Pt, W, Ta, Mg, Ti, TaN, TiN, the like, or combinations thereof. In some embodiments, the capping layer 70 may include two non-ferromagnetic material layers sandwiching another non-ferromagnetic material layer, such as another one of such as Cu, Ru, Ir, Pt, W, Ta, Mg, Ti, TaN, TiN, or the like. For example, in some embodiments, the capping layer may include Ta or Ti sandwiched between two layers of Ru. The thickness of the capping layer 70 may be between about 3 nm and about 25 nm, though other thicknesses are contemplated. In embodiments using multiple layers for the capping layer 70, each layer may be between about 1 nm and about 12 nm.

A top electrode 75 may be disposed over the capping layer 70. The top electrode 75 may be used to provide electrical connection to a conductive pattern coupled to the top of the MTJ film stack 100. The top electrode 75 may be formed of any suitable material, such as titanium, titanium nitride, tantalum, tantalum nitride, the like, or combinations thereof.

Figure 4:
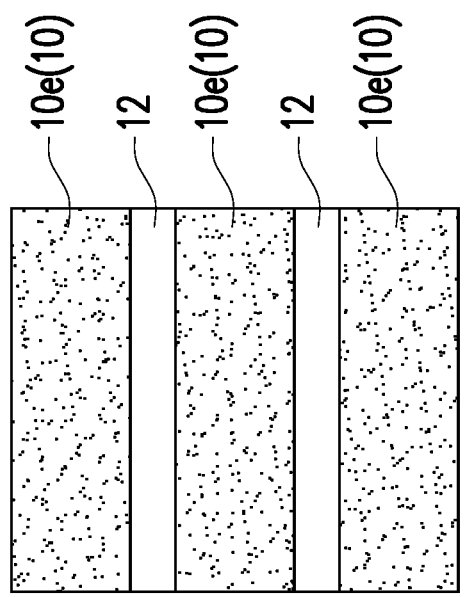
FIG. 4 is illustrations of a SOT induction structure, in accordance with various embodiments.

FIG. 4 is illustrations of a SOT induction structure, in accordance with various embodiments. In FIG. 4, SOT induction structure 10 may further include a spacer layer 12 interposed in the SOT induction structure 10, and the SOT induction structure 10 may be separated in a plurality of portions 10e, therefore, the spacer layer 12 and portions 10e may be alternately stacked. In some embodiments, the spacer layer comprises MgO or MgO/CoFeB.

In some embodiments, the aforementioned structure may be formed in the SOT induction structure 10 by following steps. The steps of FIG. 3 is performed, and when the first portion 10e of the SOT induction structure 10 is achieved a certain thickness, the first portion 10e of the SOT induction structure 10 may be removed from a processing chamber (not shown), and then the spacer layer 12 may be formed on the first portion 10e of the SOT induction structure 10. Next, the spacer layer 12 formed on the first portion 10e of the SOT induction structure 10 may be move in the processing chamber again, and the second portion 10e of the SOT induction structure 10 may be formed on the spacer layer 12. Repeat the above steps until the SOT induction structure 10 is made, but not limited to. As noted above, the composition of each portion 10e is similar to SOT induction structure 10 previously described.

FIGS. 5 through 14 illustrate intermediate steps in the formation of the magnetic memory device 300 (such as SOT-MRAM device). The materials and formation method used to form the various structures and elements of the magnetic memory device 300 are described above and are not repeated.

Figure 5:
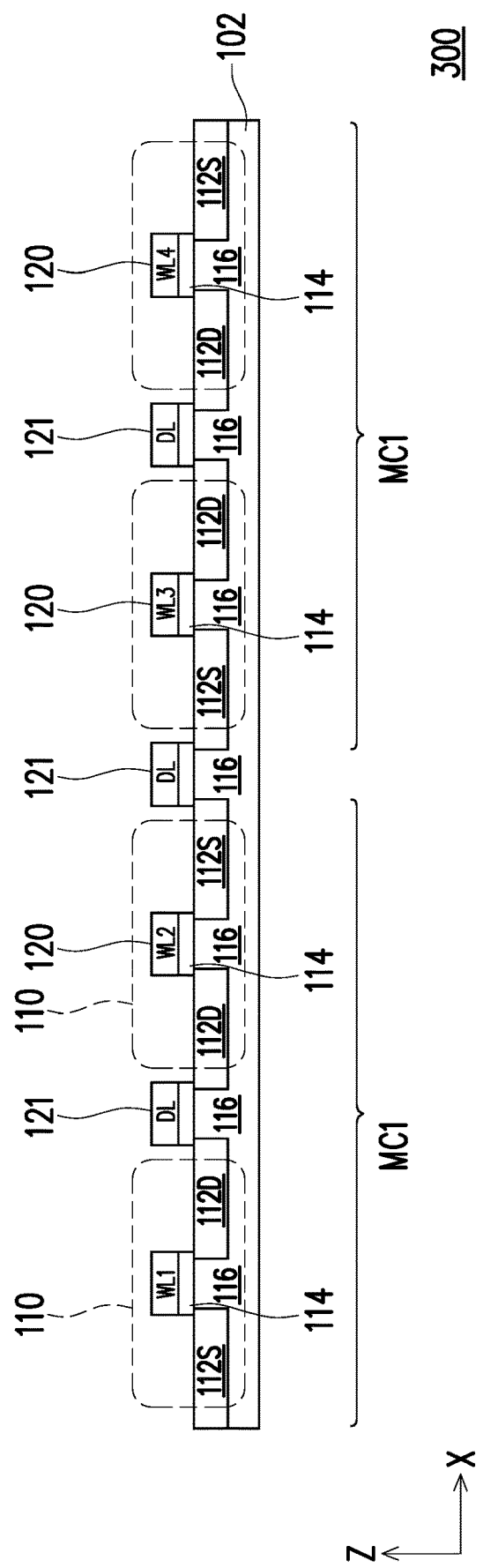
FIG. 5 through FIG. 14 are intermediate steps used in formation of a magnetic memory device, in accordance with some embodiments.

FIG. 5 illustrates a cross-sectional view of a substrate 102 and multiple FETs 110 formed on the substrate 102, in accordance with some embodiments. The FETs 110 are part of the subsequently formed magnetic memory cell MC1 (SOT-MRAM cells) of the magnetic memory device 300. Some example FETs 110 are indicated in FIG. 5. The substrate 102 may be a semiconductor substrate, such as silicon, doped or undoped, or an active layer of a semiconductor-on-insulator (SOI) substrate. The semiconductor substrate may include other semiconductor materials, such as germanium; a compound semiconductor including silicon carbide, gallium arsenic, gallium phosphide, gallium nitride, indium phosphide, indium arsenide, and/or indium antimonide; an alloy semiconductor including silicon germanium (SiGe), GaAsP, AlInAs, AlGaAs, GaInAs, GaInP, and/or GaInAsP; or combinations thereof. Other substrates, such as multi-layered or gradient substrates, may also be used.

In some embodiments, the FETs 110 are Fin Field-Effect Transistors (FinFETs) comprising fins 116, gate structures 114, and source regions 112S and drain regions 112D. As shown in FIG. 5, the fins 116 are formed on the substrate 102 and may comprise the same material as the substrate 102 or a different material. In some embodiments, dummy fins (not shown) may be formed between some fins 116 to improve process uniformity. The gate structures 114 are formed over multiple fins 116 and extend in a direction perpendicular to the fins 116. In some embodiments, spacers (not shown in the Figures) may be disposed on the sidewalls of the gate structures 114. In some embodiments, dummy gate structures 121 may be formed between some gate structures 114 to improve process uniformity. The dummy gate structures 121 may be considered "dummy transistors" or "dummy FinFETs," in some embodiments. Some gate structures 114 are used as Word Lines in the SOT-MRAM device 300 (described in greater detail below), and have been labeled as "WL," such as "WL2," accordingly. The source regions 112S and the drain regions 112D are formed in the fins 116 on either side of the gate structures 114. The source regions 112S and the drain regions 112D may be, for example, implanted regions of the fins 116 or epitaxial material grown in recesses formed in the fins 116. In the embodiment shown in FIG. 5, one side of each fin 116 is adjacent source regions 112S and the other side of each fin 116 is adjacent drain regions 112D.

The FETs 110 shown in the Figures are representative, and some features of the FETs 110 may have been omitted from the Figures for clarity. In other embodiments, the arrangement, configuration, sizes, or shapes of features such as fins 116, dummy fins, gate structures 114, dummy gate structures 21, source regions 112S, drain regions 112D, or other features may be different than shown. In other embodiments, the FETs 110 may be another type of transistor, such as planar transistors.

Figure 6:
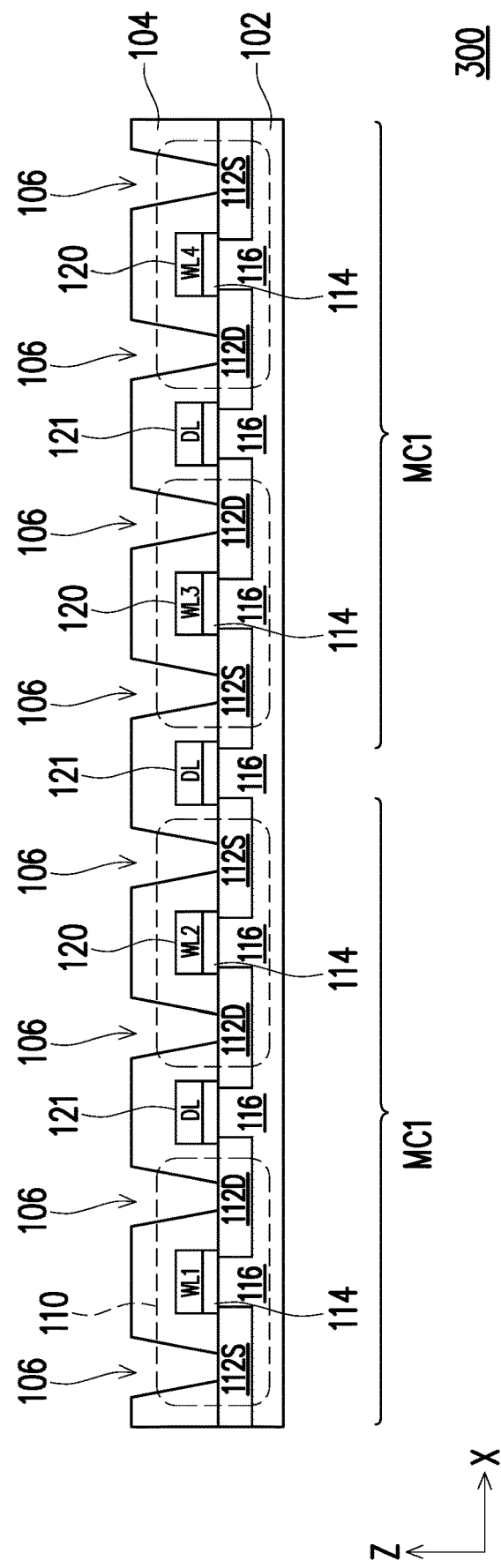

In FIG. 6, a dielectric layer 104 is formed over the substrate 102 and patterned to expose the source regions 112S and drain regions 112D, in accordance with some embodiments. The dielectric layer 104 may cover the FETs 110, and may be considered an Inter-Layer Dielectric layer (ILD) in some embodiments. The dielectric layer 104 may be formed of any suitable dielectric material including, for example, any of the materials listed above for an ILD. The dielectric layer 104 may be formed using any acceptable deposition process, such as spin coating, physical vapor deposition (PVD), chemical vapor deposition (CVD), the like, or a combination thereof. In some embodiments, the dielectric layer 104 may be a low-k dielectric material, such as a dielectric material having a dielectric constant (k value) lower than about 3.0, for example.

Figure 7:
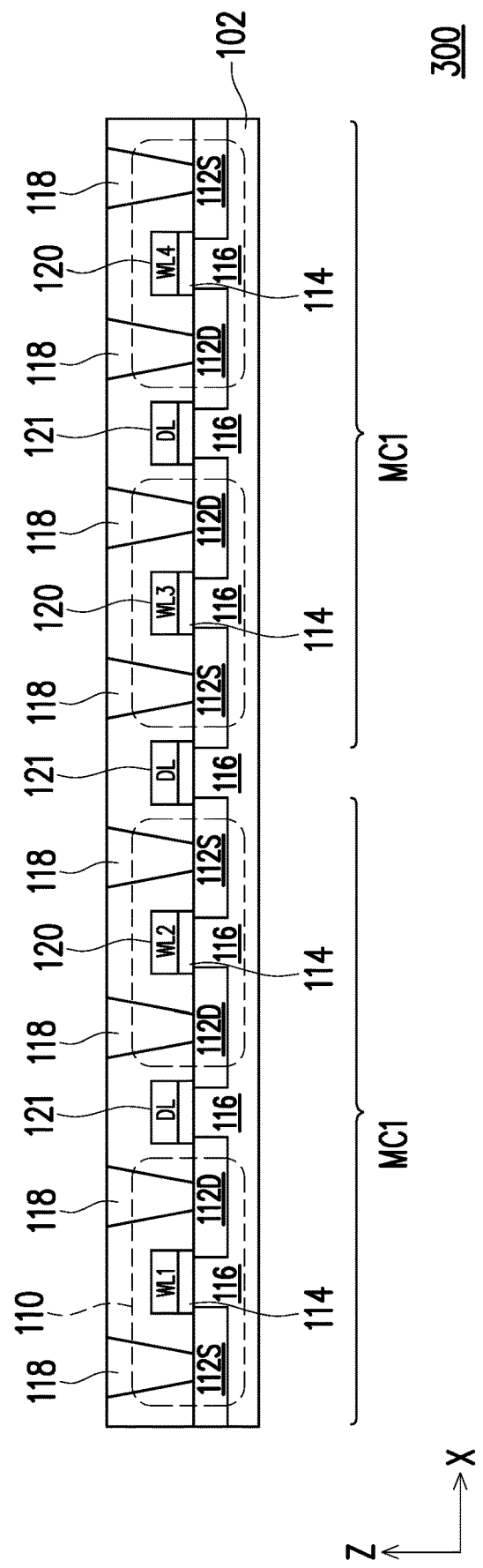

The dielectric layer 104 may be patterned to form openings 106 that expose the source regions 112S and the drain regions 112D for subsequent formation of contact plugs 118 (see FIG. 7). The dielectric layer 104 may be patterned using a suitable photolithography and etching process. For example, a photoresist structure (not shown) may be formed over the dielectric layer 104 and patterned. The openings 106 may be formed by etching the dielectric layer 104 using the patterned photoresist structure as an etching mask. The dielectric layer 104 may be etching using a suitable anisotropic etching process, such as a wet etching process or a dry etching process.

Turning to FIG. 7, contact plugs 118 are formed to make electrical connection to the source regions 112S and the drain regions 112D, in accordance with some embodiments. In some embodiments, the contact plugs 118 are formed by depositing a barrier layer (not individually shown) extending into the openings 106, depositing a conductive material over the barrier layer, and performing a planarization process such as a Chemical Mechanical Polish (CMP) process or a grinding process to remove excess portions of the blanket conductive barrier layer and the conductive material. The barrier layer or the conductive material of the contact plugs 118 may be formed using a suitable process such as Chemical Vapor Deposition (CVD), Physical Vapor Deposition (PVD), Atomic Layer Deposition (ALD), plating, or the like.

The barrier layer, if used, may be formed of any suitable material, such as TiN, Ti, TaN, Ta, the like, or combinations thereof.

Figure 8:
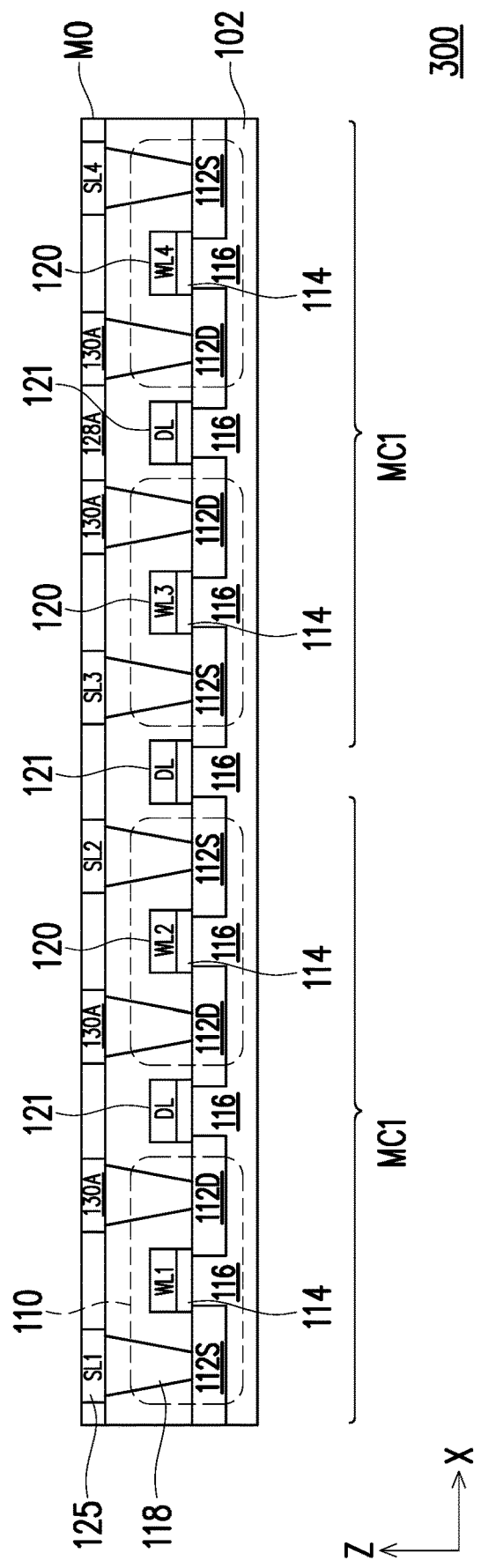

Turning to FIG. 8, conductive lines 130A are formed to electrically connect the contact plugs 118 and provide electrical routing within the SOT-MRAM device. The conductive lines 130A may be formed within a dielectric layer 128A that is formed over the dielectric layer 104. The dielectric layer 128A may be a material similar to those described above for dielectric layer 104 (see FIG. 6), and may be deposited using similar techniques as dielectric layer 104. The dielectric layer 128A may be considered an Inter-Metal Dielectric layer (IMD) in some embodiments.

The conductive lines 130A may be formed using a suitable technique such as damascene, dual-damascene, plating, deposition, the like, or combinations thereof. In some embodiments, the conductive lines 130A are formed by first depositing the dielectric layer 128A and patterning the dielectric layer 128A to form openings (e.g., using a suitable photolithography and etching process), and then filling the openings in the dielectric layer 128A with conductive material. For example, the conductive lines 130A may be formed by depositing an optional blanket barrier layer (not individually shown) over the patterned dielectric layer 128A, depositing a conductive material over the blanket barrier layer, and performing a planarization process such as a CMP process or a grinding process to remove excess portions of the blanket conductive barrier layer and the conductive material. The barrier layer or the conductive material may be similar to those described above for the contact plugs 118 (see FIG. 7), and may be deposited using similar techniques. In some embodiments, the conductive material of the contact plugs 118 and the conductive lines 130A may be deposited in the same step, for example, if a dual-damascene process is used to form the contact plugs 118 and the conductive lines 130A.

In some embodiments, the conductive lines 130A are formed by first depositing the optional blanket barrier layer over the dielectric layer 104 and contact plugs 118, depositing a conductive material over the blanket barrier layer, and then patterning the barrier layer and conductive material (e.g., using a suitable photolithography and etching process) to form the conductive lines 130A. The dielectric layer 128A may be deposited over the conductive lines 130A and a planarization process performed to expose the conductive lines 130A.

Figure 9:
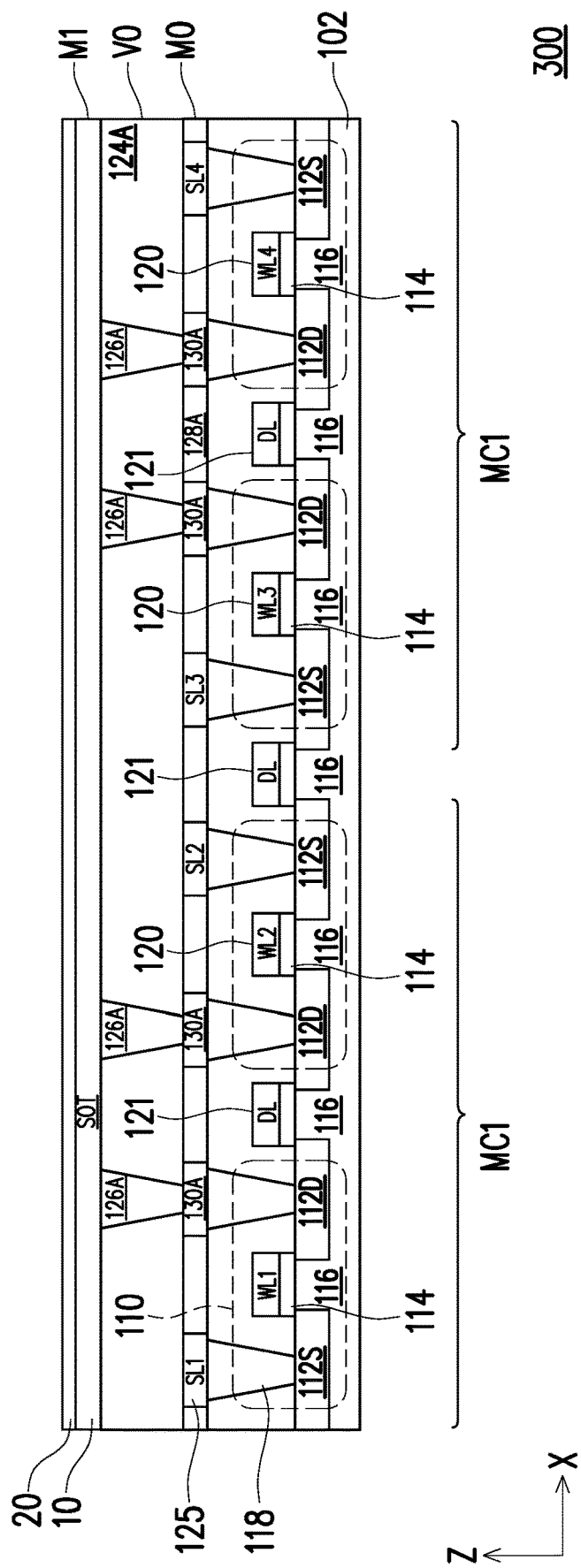

In FIG. 9, vias 126A are formed within a dielectric layer 124A to make electrical connection to the conductive lines 130A, in accordance with some embodiments. In some embodiments, the dielectric layer 124A is first formed over the conductive lines 130A and the dielectric layer 128A. The dielectric layer 124A may be a material similar to those described above for the dielectric layer 104 and the vias 126A may be formed using processes and materials similar to those described above with regard to the contact plugs 118. The process of forming conductive lines and vias are repeated to form a desired number of metal wiring layers.

In some embodiments, the vias 126A formed under the SOT induction structure 10 may be formed using a single damascene process from copper, tungsten, or titanium nitride and can function as bottom electrode 5 (see FIG. 1) for the SOT induction structure 10. An optional barrier layer may also be used, as discussed above with respect to the contact plugs 118 to prevent diffusion of the material of the contact plugs 118 to the surrounding dielectric layer 124A.

As illustrated in FIG. 9, after forming the vias 126A, the SOT induction structure 10 may be formed over the substrate 102. As noted above, in some embodiments, the vias 126A may serve as the bottom electrode 5. In some embodiments, the buffer layer 7 may be formed over the vias 126A separately or along with deposition of SOT induction structure 10 using any suitable process. In embodiments utilizing a buffer layer, the buffer layer may include magnesium oxide or the like deposited to a thickness between about 0.2 and 0.9 nm. The bottom electrode 5 may be formed using the techniques discussed above with respect to the formation of the conductive lines 130A.

After forming the buffer layer 7 (if used), the SOT induction structure 10 film stack may be deposited. The SOT induction structure 10 is formed using processes and materials such as those discussed above with respect to FIGS. 2 and 3. The spacer layer 20 is deposited over the SOT induction structure 10 using processes and materials such as those discussed above. In some embodiments, after the spacer layer 20 is deposited, the MTJ film stack 100 is deposited sequentially.

Figure 10:
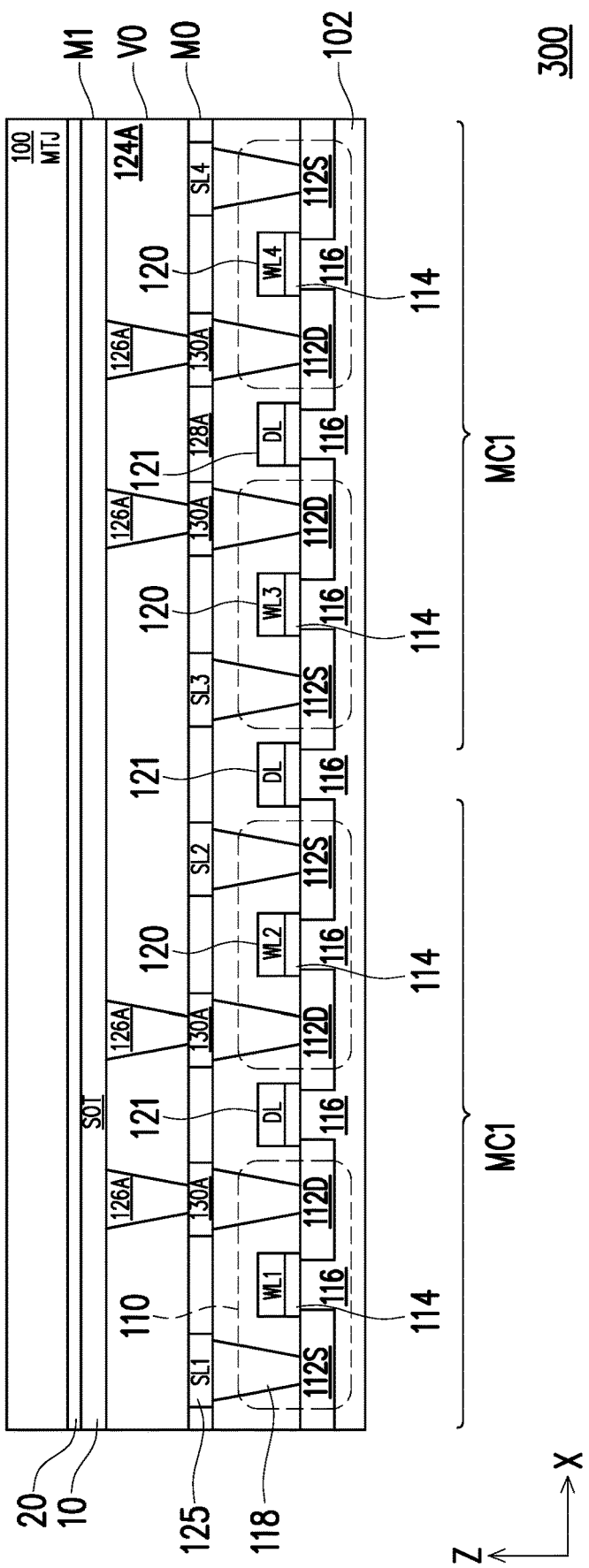

In FIG. 10, the MTJ film stack 100 may be deposited in sequential layers, such as indicated with respect to FIG. 1. Layers for the MTJ film stack 100 are formed over the SOT induction structure 10, including the free layer 30, the barrier layer 40, the reference layer 50, the pinned layer 60, the capping layer 70. In some embodiments the top electrode 75 (see FIG. 1) is then deposited, while in other embodiments the hard mask 101 (see FIG. 11B) may function as the top electrode. In some embodiments a spacer layer 20 may be formed as a first layer under the free layer 30. Each of the layers of the MTJ film stack 100 can be formed by suitable film formation methods which can provide capability of precise thickness control. Such methods may include, for example, physical vapor deposition (PVD) sputtering. Other methods may include: molecular beam epitaxy (MBE); pulsed laser deposition (PLD); atomic layer deposition (ALD); electron beam (e-beam) epitaxy; or any combinations thereof. It may be possible to use chemical vapor deposition (CVD) or its derivatives if thickness deposition can be precisely controlled.

Following deposition of the MTJ film stack 100 layers an anneal may be performed. If a first anneal after formation of the SOT induction structure 10 is performed, then in some embodiments, a second anneal after deposition of the MTJ film stack 100 may be performed in the presence of a horizontal magnetic field, for setting the in-plane crystal anisotropy of AFM layer. If a first anneal after formation of the SOT induction structure 10 is not performed, then the first anneal after deposition of the MTJ film stack 100 may be performed in the presence of a perpendicular magnetic field to enhance the PMA of the SOT induction structure 10. Then a second anneal may also be performed in the presence of a horizontal magnetic field to set the AFM layer.

Figure 11B:
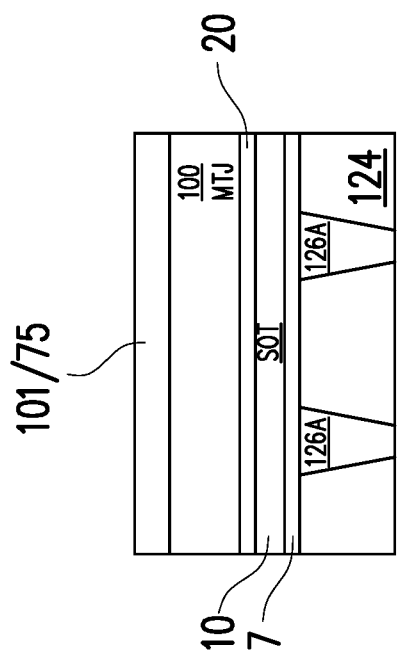
Figure 11A:
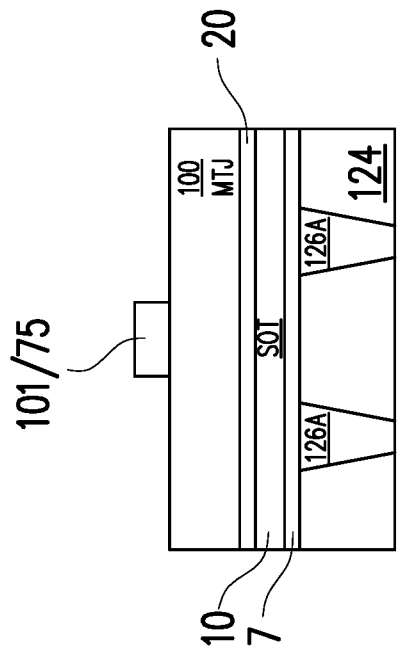

FIGS. 11A, 11B, 11C, 11D illustrate various views in a process of patterning the MTJ film stack 100 to form an MTJ pillar and patterning the SOT induction structure 10 film stack to form the SOT induction structure 10. In FIG. 11A, a hard mask layer 101 is deposited over the MTJ film stack 100 layers. The hard mask layer 101 may be deposited using any suitable process and may be made of any suitable material, such as silicon nitride, or a conductive metal layer, such as tantalum, tungsten, titanium nitride, the like, or combinations thereof, such as a first layer of a conductive metal and a second layer of a dielectric, such as silicon nitride. In embodiments where the hard mask layer 101 includes a metal, the hard mask layer 101 may also function as the top electrode 75 (FIG. 1) over the MTJ film stack 100.

The hard mask layer 101 is patterned by using one or more lithography and etching operations, as shown in FIG. 11B.

Figure 11E:
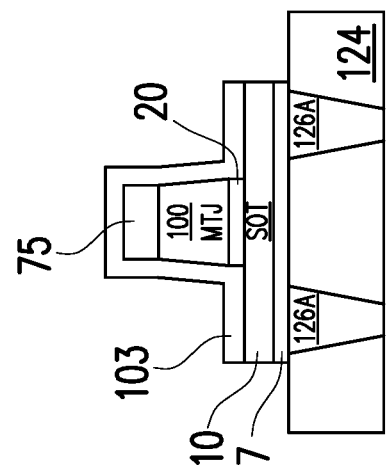
Figure 11D:
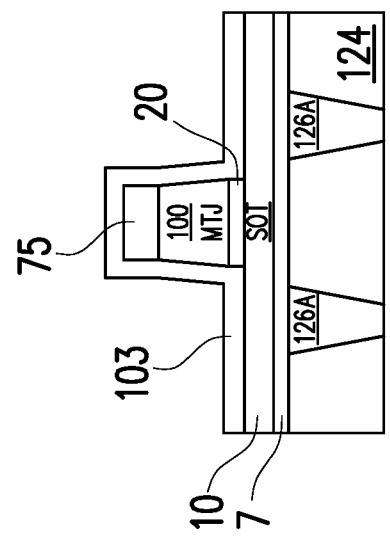
Figure 11C:
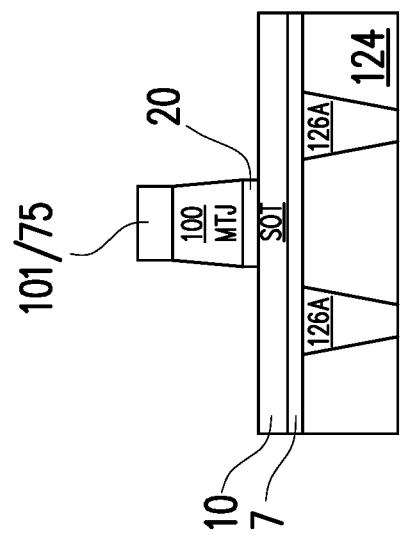

In FIG. 11C, the hard mask layer 101 is used as a mask to pattern the various films of the MTJ film stack 100. In some embodiments, the spacer layer 20 may be patterned with the MTJ film stack 100, such as illustrated in FIG. 11C (and the left hand side of FIG. 12), while in other embodiments, the spacer layer 20 may be patterned with the SOT induction structure 10 film stack, such as illustrated in FIG. 11E (and the right hand side of FIG. 12). Other embodiments may pattern the spacer layer 20 into a first and second spacer layer 20A and 20B, such as illustrated in FIG. 1. In some embodiments, as shown in FIG. 11C, the cross-sectional view of the MTJ film stack 100 has a tapered (mesa) shape. In some embodiments, the hard mask layer 101 or a dielectric portion of the hard mask layer 101 may be consumed in the patterning of the MTJ film stack 100. The remaining metal portion of the hard mask layer 101 may act as the top electrode 75 (hereafter labeled as top electrode 75).

In FIG. 11D, a dielectric protection layer 103 is blanket deposited using any suitable deposition technique, such as PVD, CVD, ALD, the like, or combinations thereof. The dielectric protection layer 103 is deposited over the SOT induction structure 10 films and the patterned MTJ film stack 100, and may be formed of any suitable material such as silicon nitride, silicon carbide, the like, or combinations thereof.

In FIG. 11E, the SOT induction structure 10 film stack is patterned to form the SOT induction structure 10 using suitable photolithography and etching techniques. Where the optional buffer layer 7 is used, it is also patterned along with the SOT induction structure 10 film stack to have the same shape in top view. FIG. 11E also shows an embodiment where the spacer layer 20 is not patterned as part of the MTJ film stack 100, but rather as part of the SOT induction structure 10 film stack. As noted above, the spacer layer 20 may include a portion patterned as part of the MTJ film stack 100 and a portion patterned as part of the spacer layer 20, such as illustrated in FIG. 1.

Figure 12:
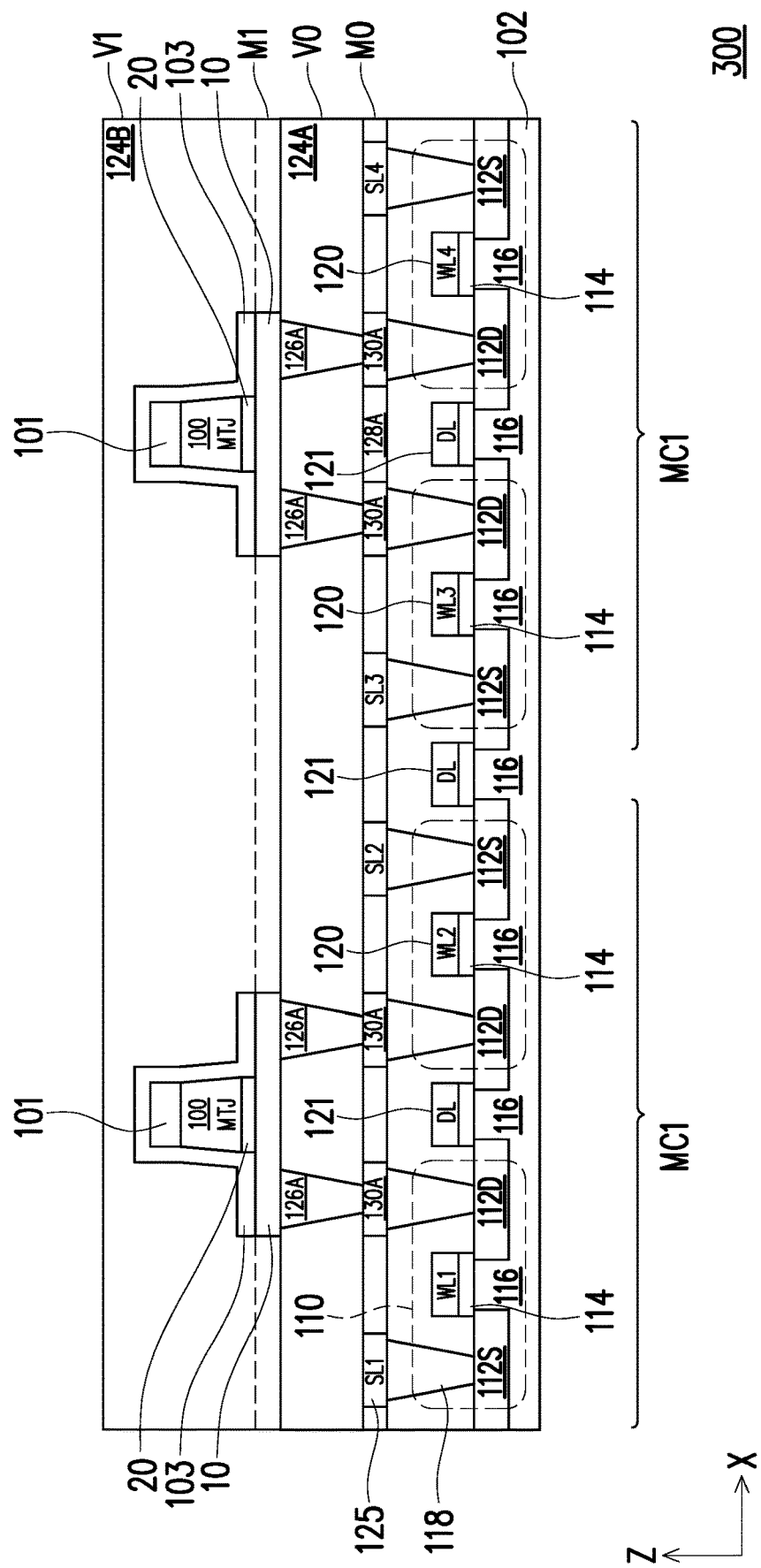

In FIG. 12, after patterning the MTJ film stack 100 and the SOT induction structure 10, one or more dielectric material layers, e.g., ILD 124B, including any of the ILD candidate materials described above, are deposited to fully cover the MTJ film stack 100. A planarization operation, such as CMP, may be performed to level the upper surface of the ILD 124B. In some embodiments, the CMP will have a floating stop in the ILD 124B, such as illustrated in FIG. 12. In other embodiments, the CMP may stop on the protective dielectric layer 103. As noted above, the left hand side MTJ film stack 100, spacer layer 20, and SOT induction structure 10 are patterned so that the spacer layer 20 is patterned with the MTJ film stack 100 and has the same shape as the MTJ film stack 100. The right hand side MTJ film stack 100, spacer layer 20, and SOT induction structure 10 are patterned so that the spacer layer 20 is patterned with the SOT induction structure 10 and has the same shape as the SOT induction structure 10. This embodiment view is omitted in subsequent Figures. A combination of the two may also be utilized, in accordance with some embodiments.

Figure 13:
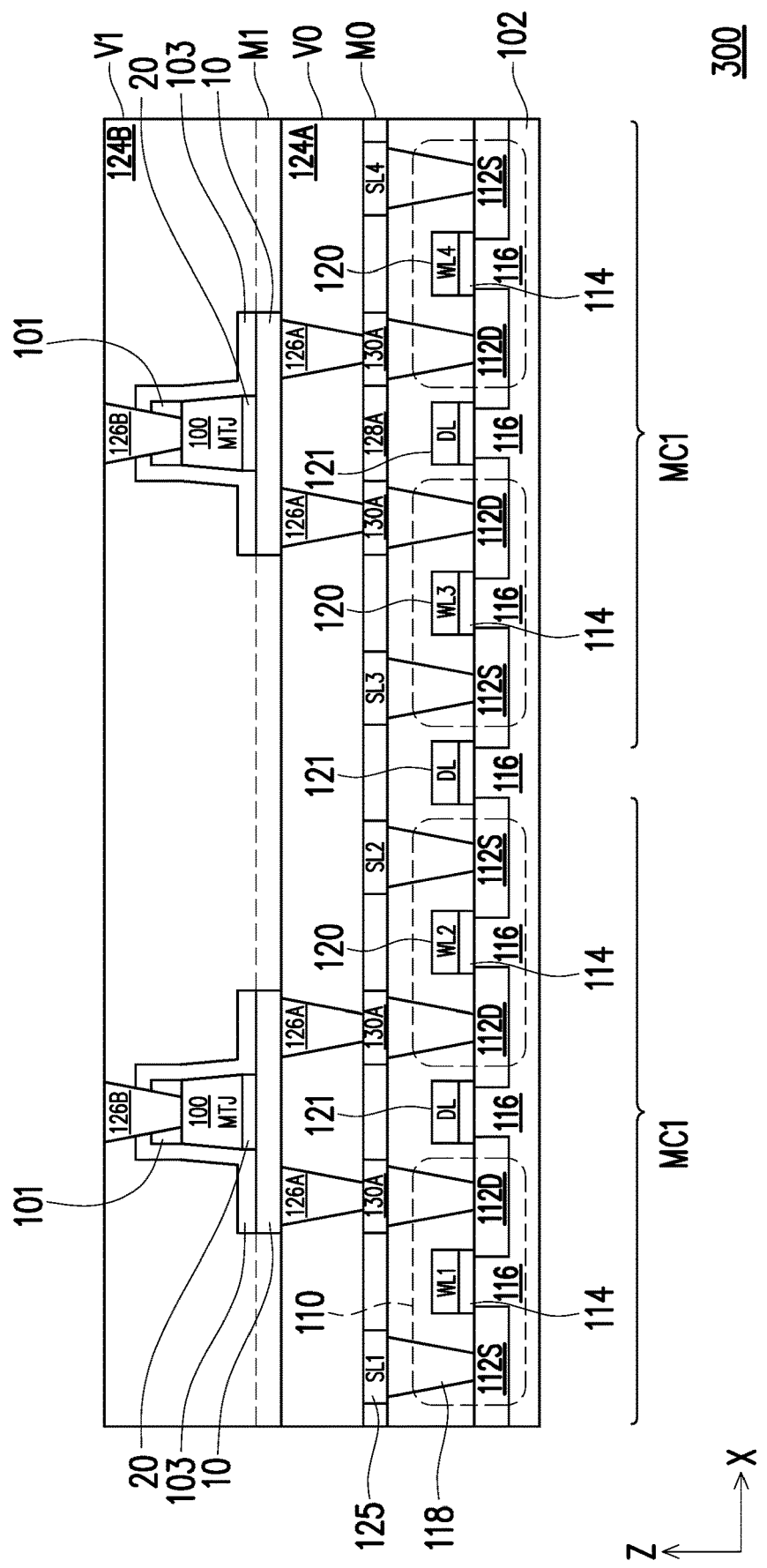

In FIG. 13, after forming the MTJ film stacks 100 and depositing the ILD 124B and performing a CMP, vias 126B may be formed through the ILD 124B and protective dielectric layer 103 to contact the top electrode 75 over the MTJ film stack 100. Vias 126B may be formed using processes and materials similar to those used to form vias 126A. For example, vias 126B may be formed using a damascene process where a mask is used to pattern openings in the ILD 124B and etch the dielectric protective layer 103, and an optional diffusion barrier layer is deposited in the openings followed by conductive plug material, followed by a CMP.

Figure 14:
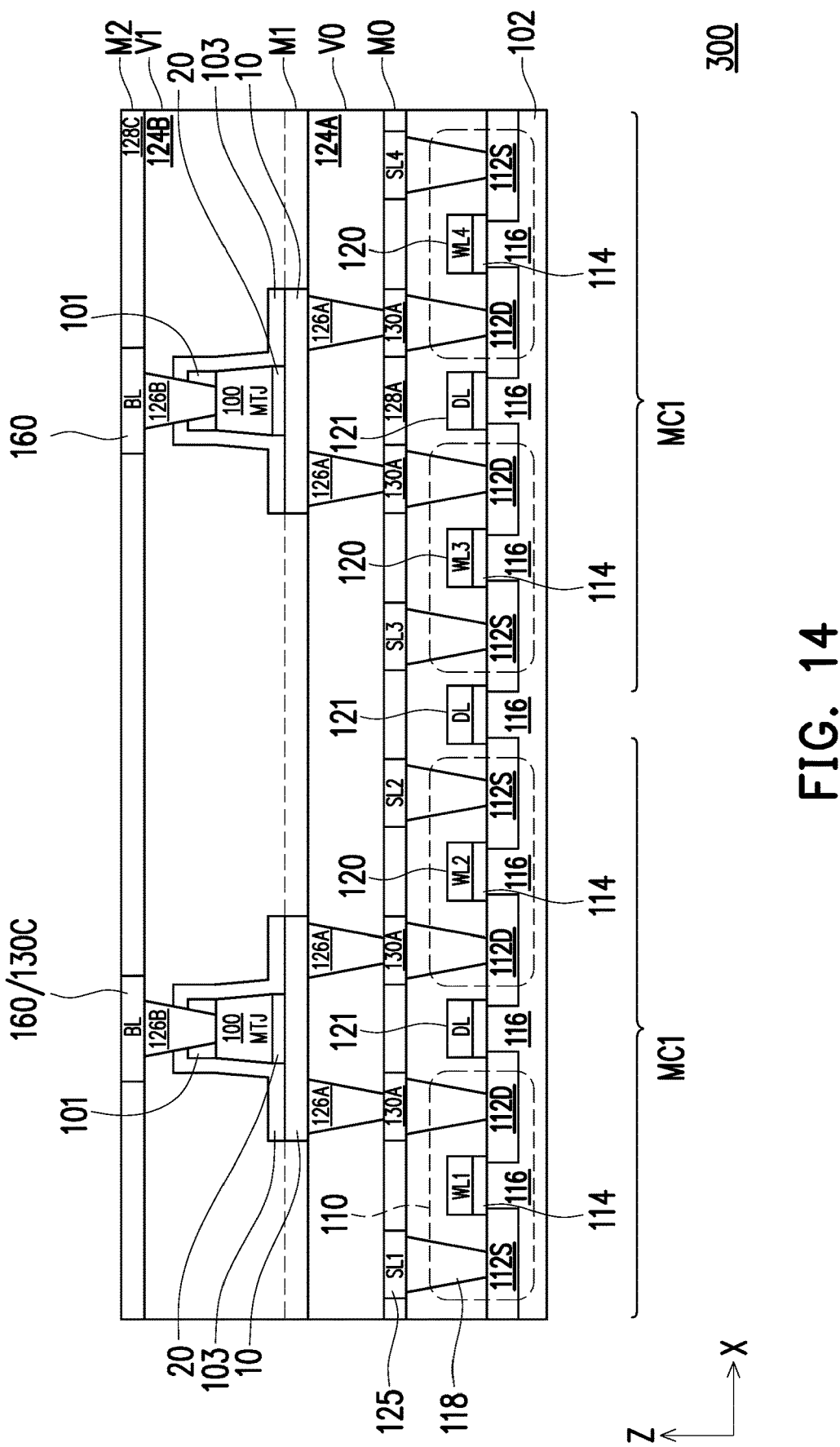

In FIG. 14, conductive lines 130C are formed to electrically connect the vias 126B and provide electrical routing within the SOT-MRAM device 300 to the bit lines 160. The conductive lines 130C may be formed within a dielectric layer 128C that is formed over the ILD 124B. The dielectric layer 128C may be a material similar to those described above for dielectric layer 104, and may be deposited using similar techniques as dielectric layer 104. The dielectric layer 128C may be considered an Inter-Metal Dielectric layer (IMD) in some embodiments.

Figure 15:
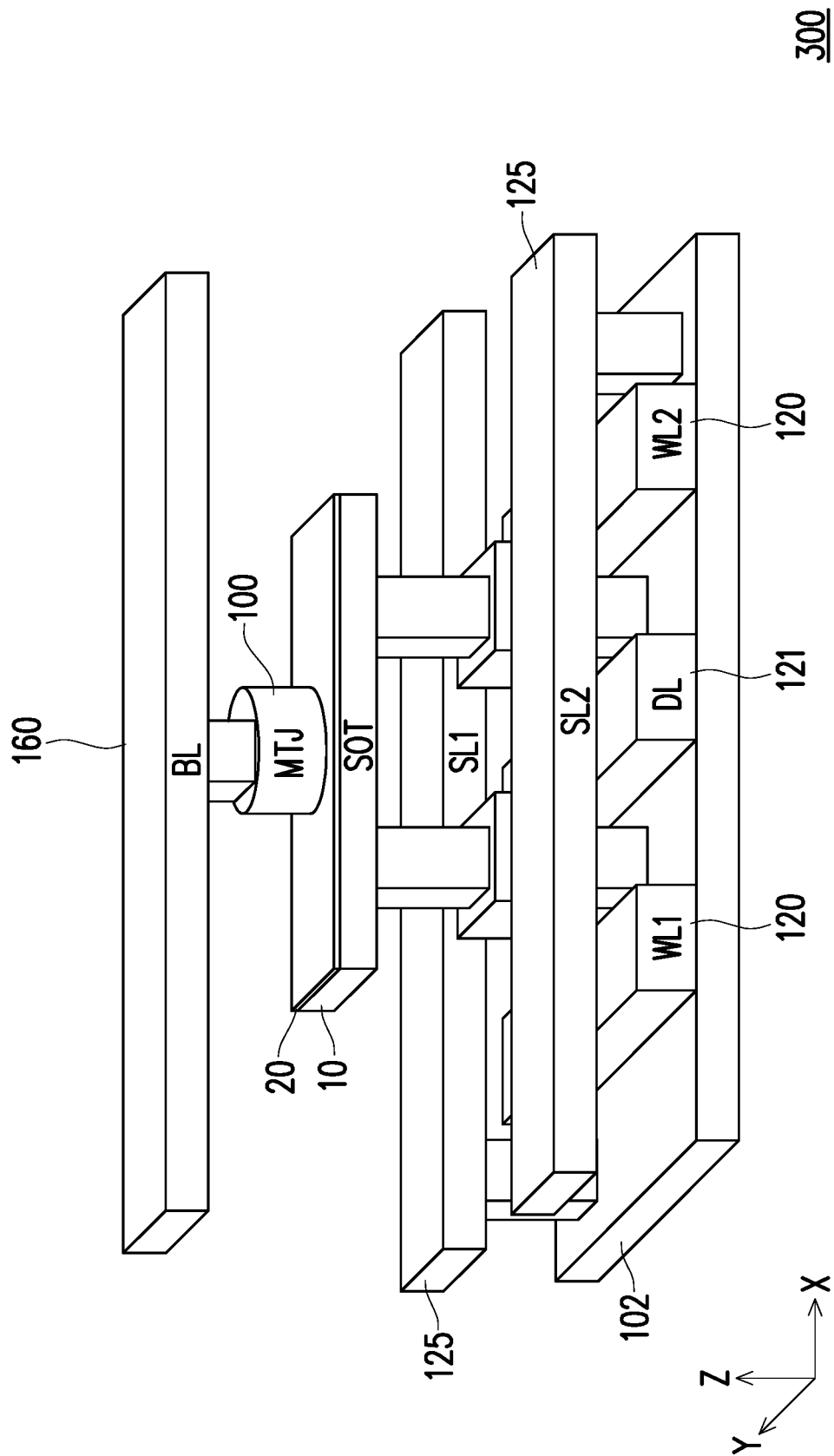
FIG. 15 is a three-dimensional view of a magnetic memory cell, in accordance with some embodiments.

FIG. 15 illustrates a three-dimensional view of MC1 of the magnetic memory device 300 of FIG. 14, in accordance with some embodiments. Materials, configurations, dimensions, processes, and/or operations described with respect to FIG. 1 through FIG. 14 may be employed in the following embodiments, and detailed explanation thereof may be omitted.

In some embodiments, a word line 120 (coupled to a gate of FET 110) extends in the Y-direction and the source lines 125 SL1 and SL2 extend in the X-direction. The SOT induction structure 10 is located above the source or drain regions of two adjacent FETs 110 and is coupled at either end to the respective source or drain regions of the two adjacent FETs 110 by vias and metal wiring layers. The SOT induction structure 10 may have a direction which is predominantly in the X-direction, in some embodiments.

As shown in FIG. 15, the MTJ film stack 100 is disposed over SOT induction structure 10 with a spacer layer 20 interposed between the MTJ film stack 100 and the SOT induction structure 10, in some embodiments. The MTJ film stack 100 may have a rounded pillar (type Z) or cylinder in ellipse shape (type X and Y), which may taper as illustrated in other Figures. The bit line 160 is electrically coupled to the top of the MTJ film stack 100 by a via and/or top electrode of the MTJ film stack and may extend in the X-direction.

In the present disclosure, the SOT induction structure 10 may be a metal doped with at least one dopant, therefore, with the aid of dopant, it can assist the metal to maintain the desired phase, therefore, the thickness and spin Hall angle (SHA) of SOT induction structure 10 may be increased, the resistivity may be decreased, while the good thermal stability of magnetic memory device MC1 may be maintained.

In accordance with some embodiments of the present disclosure, a magnetic memory device includes a substrate, a spin-orbit torque (SOT) induction structure, and a magnetic tunnel junction (MTJ) stack. The SOT induction structure is disposed over the substrate. The SOT induction structure includes a metal and at least one dopant. The MTJ stack is disposed over the SOT induction structure. In an embodiment, the metal may include W, and the at least one dopant may include Co, Ru, Pt, CoFeB, Ta, MgO, or combinations thereof. In an embodiment, a thickness of the SOT induction structure may be greater than or equal to 5 nm. In an embodiment, a spin angle (SHA) of the SOT induction structure may be greater than 0.4. In an embodiment, a magnetic memory device may further include a spacer layer interposed in the SOT induction structure, and the SOT induction structure is separated in a plurality of portion. In an embodiment, the spacer layer may include MgO or MgO/CoFeB.

In accordance with some embodiments of the present disclosure, a magnetic memory device includes a substrate, a spin-orbit torque (SOT) induction structure, and a magnetic tunnel junction (MTJ) stack. The SOT induction structure is disposed over the substrate. The SOT induction structure includes doped W. The MTJ stack is disposed over the SOT induction structure. In an embodiment, the doped W may include heavy metal, magnetic material, insulator, or combinations thereof. In an embodiment, the doped W may include Co, Ru, Pt, CoFeB, Ta, MgO, or combinations thereof. In an embodiment, a thickness of the SOT induction structure may be greater than or equal to 5 nm. In an embodiment, a spin angle (SHA) of the SOT induction structure may be greater than 0.4. In an embodiment, a magnetic memory device may further include a spacer layer interposed in the SOT induction structure, and the SOT induction structure is separated in a plurality of portion. In an embodiment, the spacer layer may include MgO or MgO/CoFeB.

In accordance with some embodiments of the present disclosure, a method including providing a substrate, forming a spin-orbit torque (SOT) induction structure over the substrate, wherein the SOT induction structure comprises metal doped with at least one dopant, and forming a magnetic tunnel junction (MTJ) stack over the SOT induction structure. In an embodiment, the SOT induction structure may be formed by sputtering a metal material and a dopant material simultaneously to form doped state. In an embodiment, the SOT induction structure may be formed by: forming a plurality of metal material layers and a plurality of dopant material layers, wherein the plurality of metal material layers and the plurality of dopant material layers are alternately stacked; and performing a heating process, such that the plurality of dopant material layers are dispersed into the plurality of metal material layers to form doped state. In an embodiment, a top layer in alternately stacked layers is the metal material layer. In an embodiment, a thickness of each of the metal material layer may be less than or equal to 1.5 nm. In an embodiment, the metal comprises W, and the at least one dopant comprises Co, Ru, Pt, CoFeB, Ta, MgO, or combinations thereof. In an embodiment, a method may further include: forming a spacer layer in the SOT induction structure.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A magnetic memory device, comprising:
a substrate;
a spin-orbit torque (SOT) induction structure disposed over the substrate, wherein the SOT induction structure comprises a metal and at least one dopant, and a spin-Hall angle (SHA) of the SOT induction structure is greater than 0.4; and
a magnetic tunnel junction (MTJ) stack disposed over the SOT induction structure.

2. The magnetic memory device of claim 1, wherein the metal comprises W, and the at least one dopant comprises Co, Ru, Pt, CoFeB, Ta, MgO, or combinations thereof.

3. The magnetic memory device as claimed in claim 1, wherein a thickness of the SOT induction structure is greater than or equal to 5 nm.

4. The magnetic memory device as claimed in claim 1, wherein the SOT induction structure comprises amorphous structure, HCP structure and/or FCC structure.

5. The magnetic memory device of claim 1, further comprising: a spacer layer interposed in the SOT induction structure, and the SOT induction structure is separated in a plurality of portion.

6. The magnetic memory device of claim 5, wherein the spacer layer comprises MgO or MgO/CoFeB.

7. The magnetic memory device of claim 1, wherein the WSOT induction structure comprises heavy metal, magnetic material, insulator, or combinations thereof.

8. The magnetic memory device of claim 1, wherein a percent of the at least one dopant is less than 10% of the SOT induction structure.

9. The magnetic memory device as claimed in claim 1, further comprising: a bottom electrode and a top electrode, wherein the SOT induction structure is located between the bottom electrode and the MTJ stack, and the MTJ stack is located between the SOT induction structure and the top electrode.

10. A manufacturing method for a magnetic memory device, comprising:
providing a substrate;
forming a spin-orbit torque (SOT) induction structure over the substrate, wherein the SOT induction structure comprises metal doped with at least one dopant, and forming the SOT induction structure comprises: sputtering a metal material and a dopant material simultaneously to form doped state; and
forming a magnetic tunnel junction (MTJ) stack over the SOT induction structure.

11. The method as claimed in claim 10, wherein further comprising: forming a bottom electrode over the substrate before forming the SOT induction structure.

12. The method as claimed in claim 10, further comprising: forming a top electrode over the MTJ stack.

13. The method as claimed in claim 10, wherein the metal material comprises W, and the at least one dopant material comprises Co, Ru, Pt, CoFeB, Ta, MgO, or combinations thereof.

14. The method as claimed in claim 10, further comprising: forming a spacer layer in the SOT induction structure.

15. A manufacturing method for a magnetic memory device, comprising:
providing a substrate;
forming a spin-orbit torque (SOT) induction structure over the substrate, wherein the SOT induction structure comprises metal doped with at least one dopant, and forming the SOT induction structure comprises:
forming a plurality of metal material layers and a plurality of dopant material layers alternately stacked to each other; and
performing a heating process, such that the plurality of dopant material layers is dispersed into the plurality of metal material layers to form doped state; and
forming a magnetic tunnel junction (MTJ) stack over the SOT induction structure.

16. The method as claimed in claim 15, wherein a top layer in alternately stacked layers is the metal material layer.

17. The method as claimed in claim 15, wherein a thickness of each of the metal material layer is less than or equal to 1.5 nm.

18. The method as claimed in claim 15, wherein the metal material layers comprise W, and the dopant material layers comprise Co, Ru, Pt, CoFeB, Ta, MgO, or combinations thereof.

19. The method as claimed in claim 15, further comprising: forming a spacer layer in the SOT induction structure.

20. The method as claimed in claim 19, wherein the spacer layer comprises MgO or MgO/CoFeB.

* * * * *